(12) United States Patent
Shah et al.

(10) Patent No.: US 8,437,902 B2
(45) Date of Patent: May 7, 2013

(54) TECHNICAL INFORMATION MANAGEMENT APPARATUS AND METHOD FOR VEHICLE DIAGNOSTIC TOOLS

(75) Inventors: Hemang Shah, Owatonna, MN (US); Lakshmy Kalivaradan, Owatonna, MN (US); Poojitha Dahanaike, Mankato, MN (US); Mathew Pasztor, Kalamazoo, MI (US); Brant Story, Faribault, MN (US); Jim Kjeer, Blooming Prairie, MN (US); Robert Kochie, Mantorville, MN (US)

(73) Assignee: Service Solutions U.S. LLC, Warren, MI (US)

( * ) Notice: Subject to any disclaimer, the term of this patent is extended or adjusted under 35 U.S.C. 154(b) by 2116 days.

(21) Appl. No.: 11/261,929

(22) Filed: Oct. 31, 2005

(65) Prior Publication Data

US 2007/0100520 A1    May 3, 2007

(51) Int. Cl.
*G01M 17/00* (2006.01)
(52) U.S. Cl.
USPC .................... 701/29.1; 701/33.2; 701/33.4
(58) Field of Classification Search .............. 701/29, 701/33, 35
See application file for complete search history.

(56) References Cited

U.S. PATENT DOCUMENTS

| | | | | |
|---|---|---|---|---|
| 5,250,935 | A * | 10/1993 | Jonker et al. | 345/440.1 |
| 2005/0137762 | A1* | 6/2005 | Rother | 701/29 |
| 2006/0126669 | A1* | 6/2006 | Beronja | 370/503 |

OTHER PUBLICATIONS

Genisys™ Next Generation information system guide; Pathfinder 2004; Napa Auto Parts; whole document.
Solarity Driveability and Component Test Diagnostic Tool guide; OTC Diagnostics; whole document.
http://www.snapon.com/Modis/flash/Modis_Test_Drive.asp.
"Modular Diagnostic Information System—The new MODIS System from Snap-On";http://buy1.snapon.com/products/diagnostics/modis-system.asp?linkback=1&partno=EEMS300D12&dir=catalog; pp. 1-3.
Snap on.com (Snap-on Tools, Automotive Diagnostics, Vehicle Repair Information),http://www.iatn.net/snapon/, pp. 1-2.
Snap-on.com (Snap-on Vantage Power Graphing Meter) http://buy1.snapon.com/products/diagnostics/Vantage.
Asp?partno=EETM300F&dir=catalog, pp. 1-3.
Snap-on.com (Snap-on Vantage Power Graphing Meter-Automotive Diagnostic Tool), http://www.snapondiag.com/snap-on-vantage.asp, pp. 1-2.

* cited by examiner

*Primary Examiner* — Helal A Algahaim
(74) *Attorney, Agent, or Firm* — Baker & Hostetler LLP

(57) ABSTRACT

A technical information management device includes an information manager, a data manager, a user interface builder, and a vehicle technical information database. The information manager accesses the database in order to provide a segment of the vehicle technical information to the user interface builder. The data manager receives conditioned input data from a vehicle diagnostic tool and sends it to the user interface builder. The user interface builder includes a graphics generator and a display screen formatter. The graphics generator converts the vehicle diagnostic data into graphical coordinate data and the display screen formatter formats the graphical coordinate data for real time display in a digital multimeter mode or in a scope mode. The user interface builder further can display a dual-display screen wherein half of the screen is a vehicle diagnostic data display and the other half of the screen displays vehicle technical information.

24 Claims, 16 Drawing Sheets

TECHNICAL INFORMATION MANAGEMENT APPARATUS AND METHOD FOR VEHICLE DIAGNOSTIC TOOLS

FIELD OF THE INVENTION

The present invention relates generally to diagnostic equipment. More particularly, the present invention relates to the management and display of technical information and diagnostic data, such as vehicle technical information and vehicle diagnostic data, on vehicle diagnostic tools.

BACKGROUND OF THE INVENTION

With the advent of the microprocessor, virtually all modern vehicles have come to utilize onboard computers to control and monitor engine and electrical system functions. Such vehicle onboard computers typically interface with a multiplicity of sensors and transducers, which continuously detect vehicle and engine operational parameters and provide representative electrical signals to the onboard computer. The data collected and processed by the onboard computer can be useful in the diagnosis of vehicle engine and electrical system malfunctions. Thus, the vehicle onboard computer typically includes a communication port connector that allows certain of the collected data to be transmitted to an independent computer analyzer, which may process the data, store the data, or present the data in a visual format that can be interpreted by vehicle maintenance and repair technicians.

In conjunction with these technological developments, a variety of specialized computer analyzers, or vehicle diagnostic tools, have been developed and marketed to provide vehicle maintenance and repair technicians access to the data available from the vehicle onboard computers. The current technology includes a variety of hand-held vehicle diagnostic tools with considerable processing capabilities, typically incorporating an integral display and capable of displaying the onboard computer data in a variety of graphical formats that allow vehicle technicians to view and interpret the data. Use of such vehicle diagnostic tools, frequently referred to as scan tools, has become the standard in vehicle diagnostics.

However, when vehicle technicians perform diagnostic testing, the technician frequently is required to consult a variety of different sources to gather the needed vehicle technical information. For example, a vehicle technician may consult a vehicle maintenance manual, a component maintenance manual, a spare parts catalog, as well as a supplementary repair manual that addresses common conditions related to a particular vehicle with associated repair instructions. In addition, the vehicle technician sometimes may be required to use more than one type of diagnostic tool in order to perform a complete and accurate diagnosis of a vehicle condition. This process can be inconvenient and time consuming. Accordingly, it is desirable to provide a method and apparatus that consolidates an assortment of technical information and diagnostic functionality in a single diagnostic tool.

SUMMARY OF THE INVENTION

The foregoing needs are met, to a great extent, by the present invention, wherein in one aspect an apparatus is provided that in some embodiments consolidates an assortment of technical information and diagnostic functionality in a single vehicle diagnostic tool.

In accordance with one aspect of the present invention, a technical information management device configured for implementation with a vehicle diagnostic tool can include a database containing vehicle technical information, an information manager configured to access the database and retrieve a segment of the information and a user interface builder configured to prepare an information display including the segment of the information. In addition, the device can include a vehicle selection feature configured to allow a user to select a vehicle type for which to retrieve information, wherein the selected vehicle type is stored throughout a diagnostic session and the information manager is further configured to retrieve information corresponding to the selected vehicle type.

In accordance with another aspect of the present invention, a technical information management device configured for implementation with a vehicle diagnostic tool can include a database containing vehicle technical information, a data manager configured to receive conditioned vehicle diagnostic data from the diagnostic tool and format the diagnostic data and an information manager configured to access the database and retrieve a first segment of the information. In addition, the device can include a user interface builder configured to prepare a data display including the diagnostic data and a first logical button whereby a user can access a menu of available vehicle technical information, and to prepare an information display including the first segment of the information and a second logical button, and to replace at least a portion of the data display with the information display based on user selection of a choice from the menu, and to return directly to the data display based upon user selection of the second logical button.

In accordance with yet another aspect of the present invention, a method of managing technical information in a vehicle diagnostic tool can include the steps of storing a database containing vehicle technical information, facilitating user selection of a vehicle type for which to retrieve information and storing the selected vehicle type throughout a diagnostic session. In addition, the method can include accessing the database to retrieve a segment of the information corresponding to the selected vehicle type and preparing an information display including the segment of the information.

In accordance with still another aspect of the present invention, a computer program product configured to manage technical information in a vehicle diagnostic tool, including a computer-readable medium encoded with instructions configured to be executed by a processor in order to perform predetermined operations including the steps of storing a database containing vehicle technical information, facilitating user selection of a vehicle type for which to retrieve information and storing the selected vehicle type throughout a diagnostic session. In addition, the predetermined operations can include accessing the database to retrieve a segment of the information corresponding to the selected vehicle type and preparing an information display including the segment of the information.

In accordance with another aspect of the present invention, a technical information management device configured for implementation with a vehicle diagnostic tool can include means for storing a database containing vehicle technical information, means for facilitating user selection of a vehicle type for which to retrieve information and means for storing the selected vehicle type throughout a diagnostic session. In addition, the device can include means for accessing the database to retrieve a segment of the information corresponding to the selected vehicle type and means for preparing an information display including the segment of the information.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
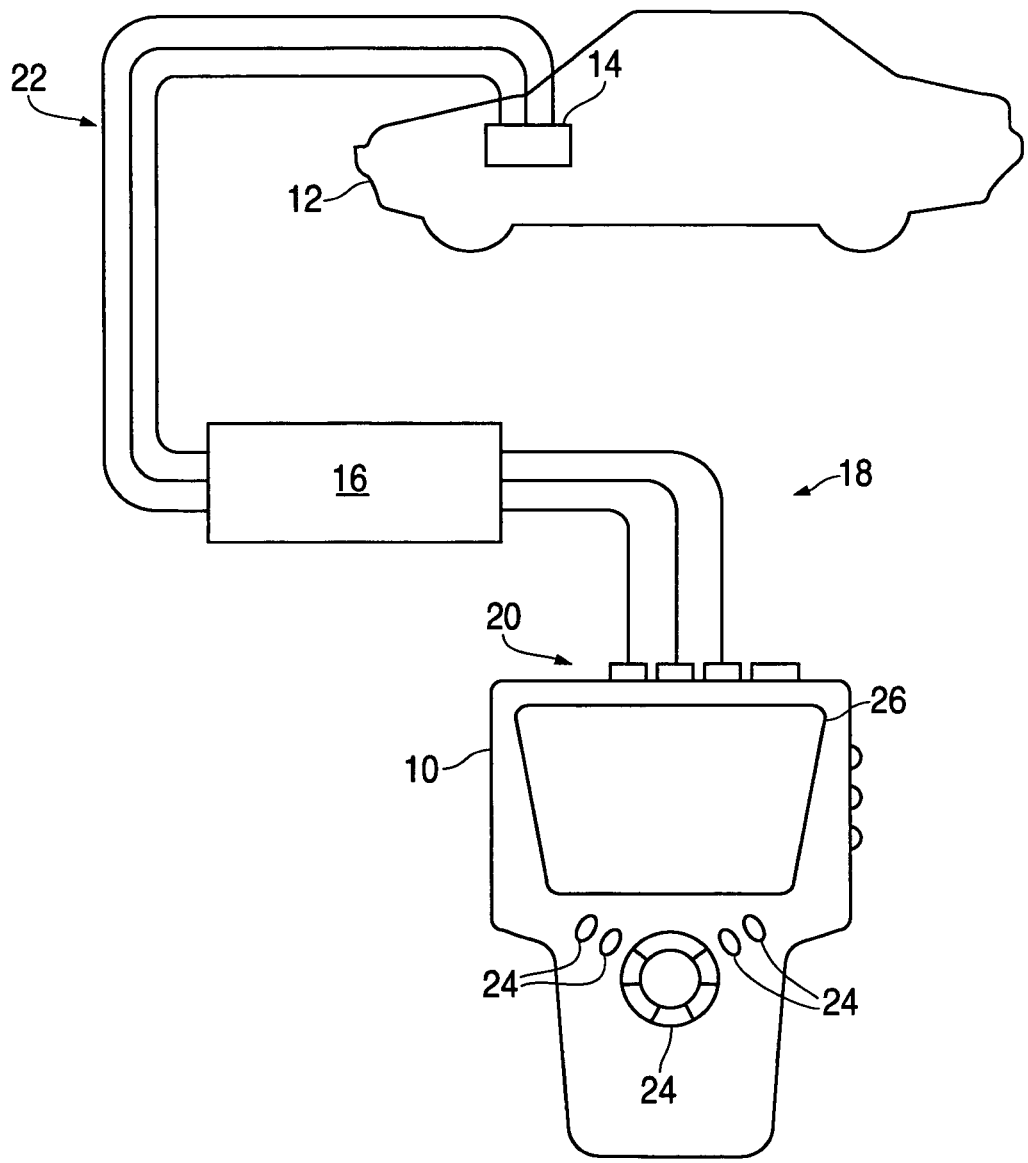
FIG. 1 illustrates an exemplary technical information management device of a type suitable for carrying out the functions of an embodiment of the invention.

An embodiment in accordance with the present invention provides a technical information management device for vehicle diagnostic tools. The technical information management device can include a database, an information manager, a data manager, and a user interface builder. The user interface builder can further include a graphics generator and a display screen formatter. The technical information management device is configured to access vehicle technical information contained in the database and prepare the information for display on a display device.

The user interface builder can convert vehicle diagnostic data into graphical coordinate data and format the data for display. In addition, the user interface builder can format graphical coordinate data and vehicle technical information for simultaneous display on separate portions of a display screen.

As a result, the technical information management device is capable of consolidating vehicle technical information from a variety of sources and diverse diagnostic functionality in a single vehicle diagnostic tool. Thus, a vehicle technician can consult the vehicle technical information and perform complete and accurate diagnostic testing from a single source, the vehicle diagnostic tool. The invention will now be described with reference to the drawing figures in which like reference numerals refer to like parts throughout.

A representative technical information management device of a type suitable for carrying out the functions of an embodiment of the invention is shown in FIG. 1. The technical information management device can include a vehicle diagnostic tool 10 that is configured to perform diagnostic testing on a vehicle 12, such as an automobile. In some embodiments, the vehicle diagnostic tool 10 can be connected to an electrical component 14 of the vehicle 12 in order to perform diagnostic testing.

In an embodiment, the vehicle diagnostic tool 10 can be connected to a signal conditioning module 16 by way of a first electronic link 18, which can include multiple wires or other signal carrying devices coupled to one or more electrical connectors 20 on the vehicle diagnostic tool 10. Similarly, the signal conditioning module 16 can be connected to the electrical component 14 by way of a second electronic link 22, which can include multiple wires or other electrical signal carrying devices. For example, the electronic links 18, 20 can include a serial bus, a parallel bus, a local area network (LAN) or wide area network (WAN) interface, the Internet, or the like. In other embodiments, the electronic link 18, 20 can include a wireless communication network, an optical interface, or the like. The vehicle diagnostic tool 10 can be configured to operate the technical information management device.

In an embodiment, the vehicle diagnostic tool is a handheld, microprocessor-based device, which communicates information to the user and requests user input by way of an interactive, menu-driven, visual display-based user interface.

For example, the vehicle diagnostic tool 10 can include several buttons 24, or keys, such as the direction buttons and the oval-shaped input buttons shown in FIG. 1, with which the user may interactively input information or select menu items. Furthermore, the vehicle diagnostic tool 10 can include a display screen 26, for example, a cathode ray tube (CRT) screen or a liquid crystal diode (LCD) screen. Nevertheless, any number of additional functional user interface schemes could be incorporated in the present invention in place of this interface scheme, with or without the use of an integral visual display device or buttons or keys, including a voice-activated system.

An embodiment of the present invention includes the Genisys vehicle diagnostic tool, manufactured by the OTC Division of the SPX Corporation in Owatonna, Minn. The Genysis is a hand-held instrument designed to operate software applications developed for automotive diagnostics, which incorporates a Motorola Power PC 823 processor and a color graphics LCD display. Another embodiment includes the Solarity vehicle diagnostic tool, manufactured by the OTC Division of the SPX Corporation in Owatonna, Minn. However, in other embodiments, the vehicle diagnostic tool 10 can be one of any number of commercially available makes and models, or any other device capable of receiving, processing and displaying vehicle diagnostic data in the disclosed layouts.

Figure 2:
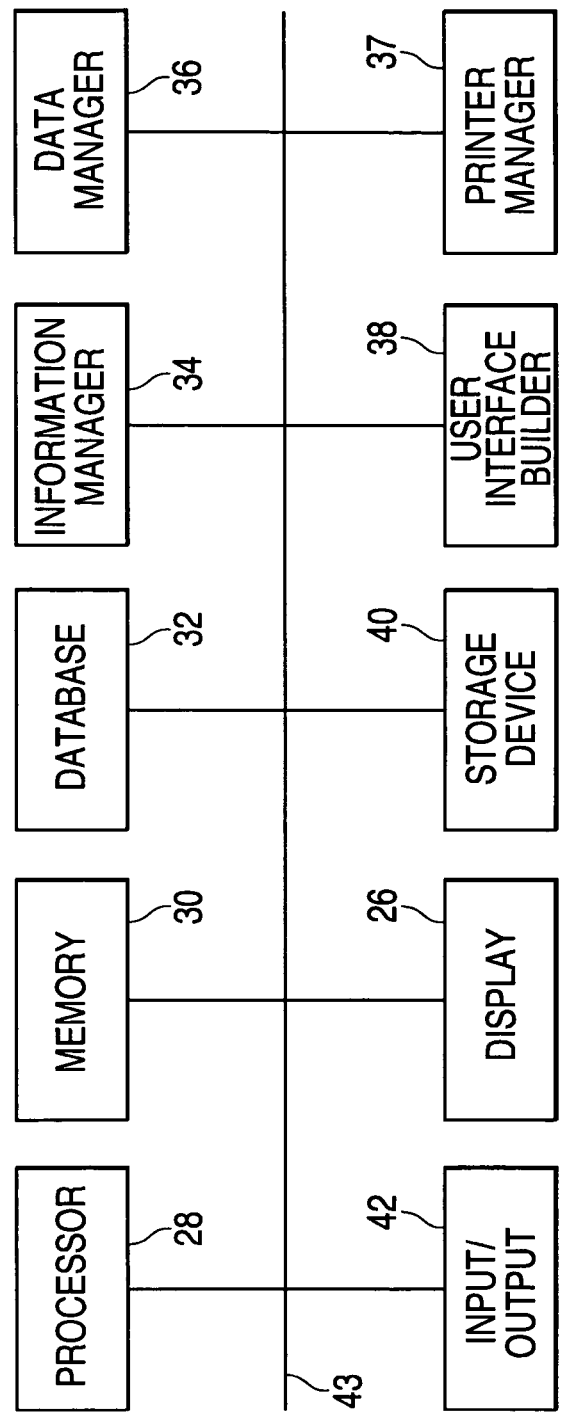
FIG. 2 is a diagrammatic representation of a technical information management device according to an embodiment of the invention.

An embodiment of the present inventive apparatus and method is illustrated in FIG. 2. The technical information management device can include a processor 28, a memory device 30, a database 32, an information manager 34, a data manager 36, a printer manager 37, a user interface builder 38, a storage device 40, the display device 26, and an input/output (I/O) device 42, all of which can be connected by a data link, such as the data bus 43 depicted in FIG. 2.

In one embodiment, the processor 28, the memory device 30, the storage device 40, the display device 26 and the input/output device 42, can be integral hardware devices included in the vehicle diagnostic tool 10. Additionally, the database 32, the information manager 34, the data manager 36, the printer manager 37, and the user interface builder 38 can be implemented in software loaded into the storage device 40 or the memory device 30 of the vehicle diagnostic tool 10. In other embodiments, the software implementations can be executed on any suitable processor, such as a server, a personal computer (PC), a Personal Digital Assistant (PDA), a collection of networked servers or personal computers, a mainframe computer, or the like.

The disclosed systems and methods can be implemented using hardware, for example in the form of an integrated circuit; or using software, for example, in the form of stored program code; or using a combination of hardware and software. In various embodiments where the disclosed systems and methods are implemented using a programmable device, such as a processor-based system or programmable logic device, it should be appreciated that the disclosed systems and methods can be implemented using any of various known or later-developed programming languages, such as FORTRAN, C, C++, Pascal, Ada, Java, Perl, VHDL, or the like.

Accordingly, various storage media, such as magnetic computer disks, optical disks, integrated circuit (IC) electronic memories and the like, can be utilized that can contain information that can direct a device, such as a computer or microprocessor, to implement the disclosed systems or methods. Once an appropriate device has access to the information data and instructions contained on the storage media, the storage media can provide the information data and instructions to the device, thus enabling the device to perform the disclosed systems or methods.

For example, if a memory device containing appropriate information, such as a source file, an object file, an executable file, or the like, were provided to a computer, the computer could receive the information, appropriately configure itself and perform the functions of the various systems and methods outlined in this disclosure in order to implement the various systems and methods. That is, the computer could receive various portions of information and instructions from the memory device relating to different elements of the disclosed systems or methods, implement the individual systems or methods, and coordinate the functions of the various disclosed systems or methods.

The database 32 can be stored in the storage device 40, which can be integral to the vehicle diagnostic tool 10. The storage device 40 can include any suitable computer-readable medium. The database 32 can include a variety of vehicle technical information for use by vehicle technicians in diagnosing and repairing vehicle systems and components. For example, the database 32 can include component functional test procedures and vehicle system diagnostic test procedures. In addition, the database 32 can include vehicle wiring information or wiring diagram data.

The vehicle system tests that can be run by the vehicle diagnostic tool 10 can include complete diagnostic procedures and automated testing, for example, exhaust gas recirculation (EGR) system tests; canister purge system tests; fuel control tests, including injectors, air-to-fuel mixture control (M/C) solenoid and oxygen sensor; fuel delivery, including fuel pressure, fuel volume, pressure regulator, fuel pump voltage and current; charging system, including alternator voltage, current and diode; starter cranking tests and voltage drop; ignition system, including coil, module, wires and plugs; On-Board Diagnostic (OBD) system, including idle controls, out or range, and no signal tests; no start, including ignition, fuel and compression; back pressure; transmission pressure, solenoid, and torque converter clutch (TCC) tests. In some embodiments, the system diagnostic tests can include vehicle type-independent tests, for example, written in a generic format that can be applied to many vehicles.

Furthermore, the database 32 can include textual vehicle technical information including circuit descriptions, component specifications, torque specifications, tune up fuel specifications, tune up ignition specifications, oil light reset procedures, and additional indexed information regarding vehicle systems and components, as well as vehicle-independent system and component information. The database 32 can in some embodiments include a compilation of known possible vehicle conditions based on vehicle field experience and associated repair guidelines that provide instructions for resolving the known vehicle conditions. Torque specifications can include, for example, cylinder head and intake manifold torque sequence pictures including torque and torque angle specifications. Oil light reset procedures can include the manual reset procedure for oil service lights.

Indexed information can include helpful information including definitions and how-to procedures for scope and automotive terminology. In addition, the vehicle technical information can include graphics or image data representing a vehicle electrical connector diagram, a component or control module location on the vehicle and a transmission pan identification image. Additionally, the database 32 can include graphic or image data representing reference wave forms that are typical for a particular vehicle system or component or simulated vehicle diagnostic data.

The data manager 36 can be configured to receive conditioned vehicle diagnostic data from the vehicle diagnostic tool 10. For example, conditioned vehicle diagnostic data can include digitized data representative of an analog electrical signal from an electrical component 14 that has been filtered, transformed or quantized by the signal conditioning module 16 (see FIG. 1); or data from an onboard computer.

The data manager 36 can also be configured to send the conditioned vehicle diagnostic data to the storage device 40 to be saved for future use. In addition, the data manager 36 can send the conditioned vehicle diagnostic data to the user interface builder 38 to be prepared for real-time display. In the case that conditioned vehicle diagnostic data is saved, the data manager 36 can be configured to later retrieve the conditioned data from the storage device 40 at a later time and send the stored data to the user interface builder 38 for display at that time.

The printer manager 37 can format the vehicle technical information or vehicle diagnostic data to be printed on a printer, for example, a laser printer, an ink jet printer, or the like. The printer manager 37 can be configured to format the information or data for a variety of different printer models, produced by different manufacturers. The printer manager 37 can then send the formatted information or data to the printer by way of a serial or parallel bus 43, or a wireless network. For example, in an embodiment the vehicle technician can print the display screen view or the whole text or frame if wider than the display screen.

Figure 3:
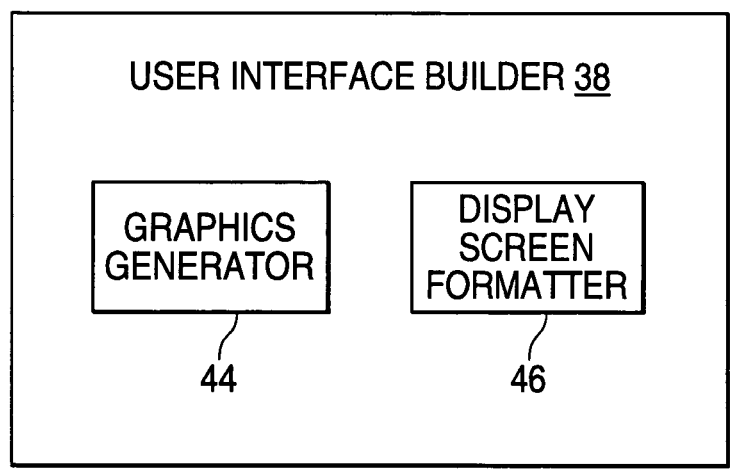
FIG. 3 is a diagrammatic representation showing a detail view of a user interface builder of FIG. 2 according to an embodiment of the invention.

The user interface builder 38 can prepare information for display on the display device 26 (see FIG. 1). As shown in FIG. 3, the user interface builder 38 can include a graphics generator 44 and a display screen formatter 46. The user interface builder 38 can further be configured to provide the conditioned vehicle diagnostic data to the graphics generator 44, which can convert the conditioned data into graphical coordinate data, for example, an image file such as a bit map (.bmp), JPEG, (.jpg) .tif or .gif file, a proprietary image format, or the like.

Figure 4:
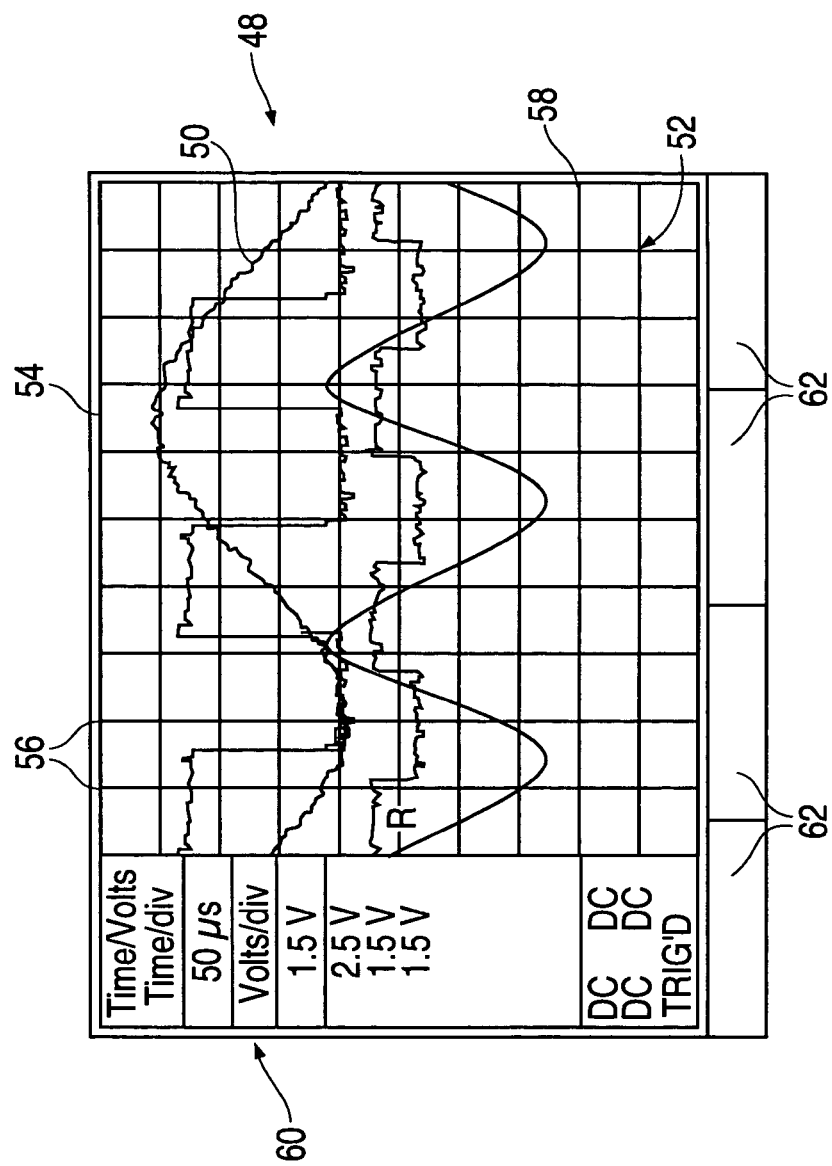
FIG. 4 is a diagrammatic representation of a scope display layout of the user interface builder of FIG. 2 according to an embodiment of the invention.

The graphics generator 44 can configure the graphical coordinate data in order to create a display image such as the scope display layout 48 shown in FIG. 4. The scope display layout 48 can include one or more display graphs 50, or charts, on a coordinate grid 52 that represent the vehicle diagnostic data. One embodiment can include up to four simultaneous display graphs 50 on the coordinate grid 52. For example, the graph 50 can represent a voltage level measured from the electrical component 14 over a period of time. As a specific example, in the scope display layout 48 shown in FIG. 4, the divisions between the vertical lines 56 (corresponding to a horizontal axis of the chart 52) represent fifty microseconds (μs) per division, while the divisions between the horizontal lines 58 (corresponding to a vertical axis of the chart 52) represent 1.5 volts per division. In another embodiment, the scope display layout 48 can include four independent display graphs 50 representing four different signals or vehicle diagnostic data.

The scope display layout 48 also can include a key 60, or legend, that includes information regarding the display chart 52 or the display graphs 50. For example, the key 60 can include information regarding the units of measure, scale, the identity of the various display graphs 50, or the like. Furthermore, the scope display layout 48 can include one or more logical display buttons 62 that are configured to receive user input. In one embodiment, the user input is received by way of physical electromechanical switch buttons 26 on the vehicle diagnostic tool 10, such as those shown in FIG. 1, associated with each of the logical display buttons 62. However, in other embodiments the user input can be received by way of a pointing device, such as a computer mouse, track ball, touch screen, touch pad, pointing stick, light pen, digitizing tablet with a stylus, data glove, or the like.

Furthermore, the user interface builder 38 can be configured to produce an image file for any suitable display screen pixel resolution, for example, 128×128 pixels, 280×240 pixels, 320×240 pixels, or the like. In addition, the user interface builder 38 can be configured to update the display screen 26 at a rate of, for example, between 150 kHz and 25 MHz. In one embodiment, the update rate is 400 MHz or less. However, in other embodiments, the user interface builder 38 can be configured to update the display screen 26 at any suitable rate.

The scope display layout 48 is designed to have the general appearance of an oscilloscope screen, and can be configured to operate with the high sampling rate signal conditioning module 16 (see FIG. 1). For example, in one embodiment, the signal conditioning module 16 can include a field-programmable gate array (FPGA) configured to convert analog electrical signals, such as voltage measurements, current measurements, resistance measurements, frequency, alternating current measurements, or the like, received by way of the second electronic link 22 to a digital data format at a sampling rate of, for example, 400 MHz. The digital data signal, or signals, is then sent to the vehicle diagnostic tool 10 by way of the first electronic link 18. In addition, the signal conditioning module 16 can perform other signal conditioning functions, for example, analog or digital filtering, signal transformations, scale adjustments, analog-to-digital (A/D) conversion, quantization, or the like.

Figure 5:
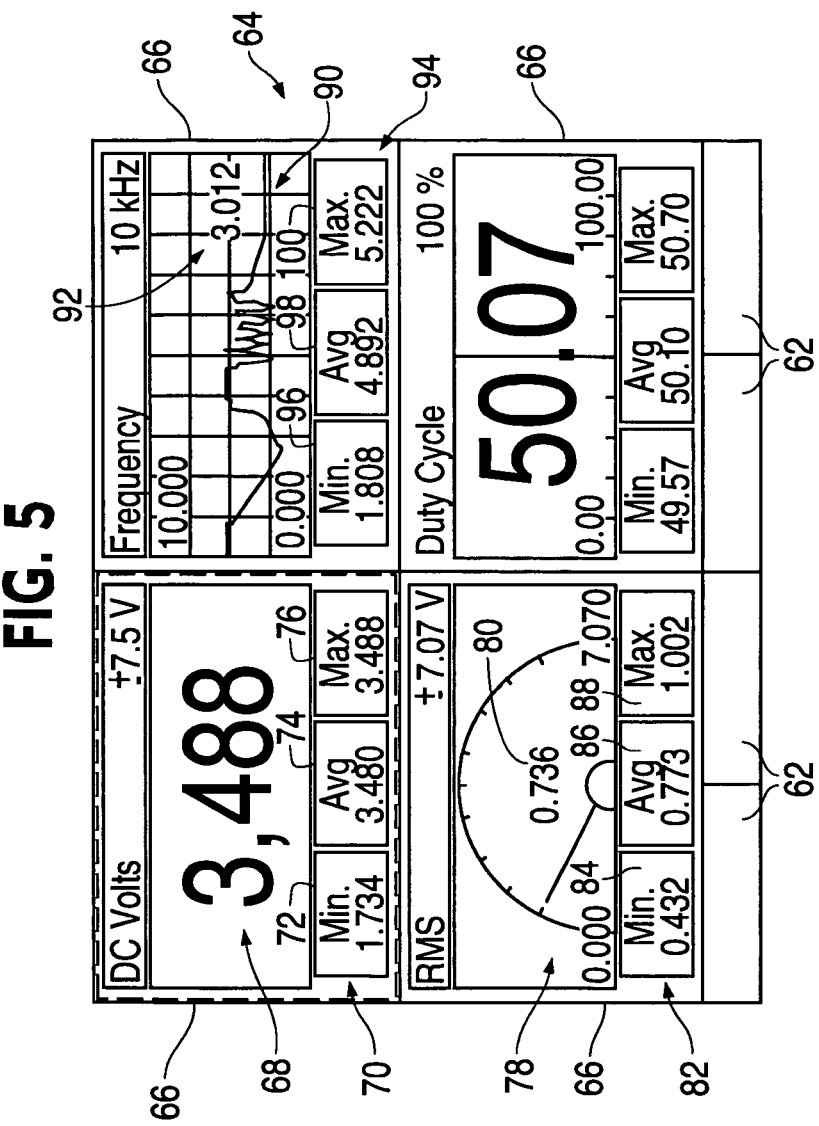
FIG. 5 is a diagrammatic representation of a digital multimeter display layout of the user interface builder of FIG. 2 according to an embodiment of the invention.

In addition, the graphics generator 44 can convert the conditioned vehicle diagnostic data into a digital multimeter display layout 64, such as that shown in FIG. 5. In the embodiment shown in FIG. 5, the digital multimeter display layout 64 can include one or more display frames 66 that include one or more representations of the vehicle diagnostic data. For example, the digital multimeter display frame 66 can include a numeric representation 68 of a current vehicle diagnostic data value. The display frame 66 can also include additional digital numeric data, for example, a minimum data value 72, an average data value 74 and a maximum data value 76 attained during a specified time period.

As another example, the display frame 66 can include a graphical representation of a dial meter 78 with the current data value also displayed in digital numeric form 80. This display panel 66 also can include additional data representations 82, for example, a minimum data value 84, an average data value 86 and a maximum data value 88 attained during a specified time frame. As yet another example, the display panel 66 can include a graphing meter representation 90 of a data parameter. Here again, the display panel 66 can additionally include a digital numeric representation of the current data value 92 and additional data representations 94, for example, a minimum data value 96, an average data value 98 and a maximum data value 100 attained during a specified time period.

Furthermore, the digital multimeter display layout 64 can include one or more logical display buttons 62 configured to receive user input. One embodiment includes four logical display buttons 62 as shown in FIG. 5; The digital multimeter display layout 64 is configured to have the general appearance of a digital multimeter and can display a variety of vehicle diagnostic data, for example, voltage measurements, current measurements, resistance measurements, frequency, alternating current voltage levels (root mean squared), duty cycle, or the like.

Figure 6:
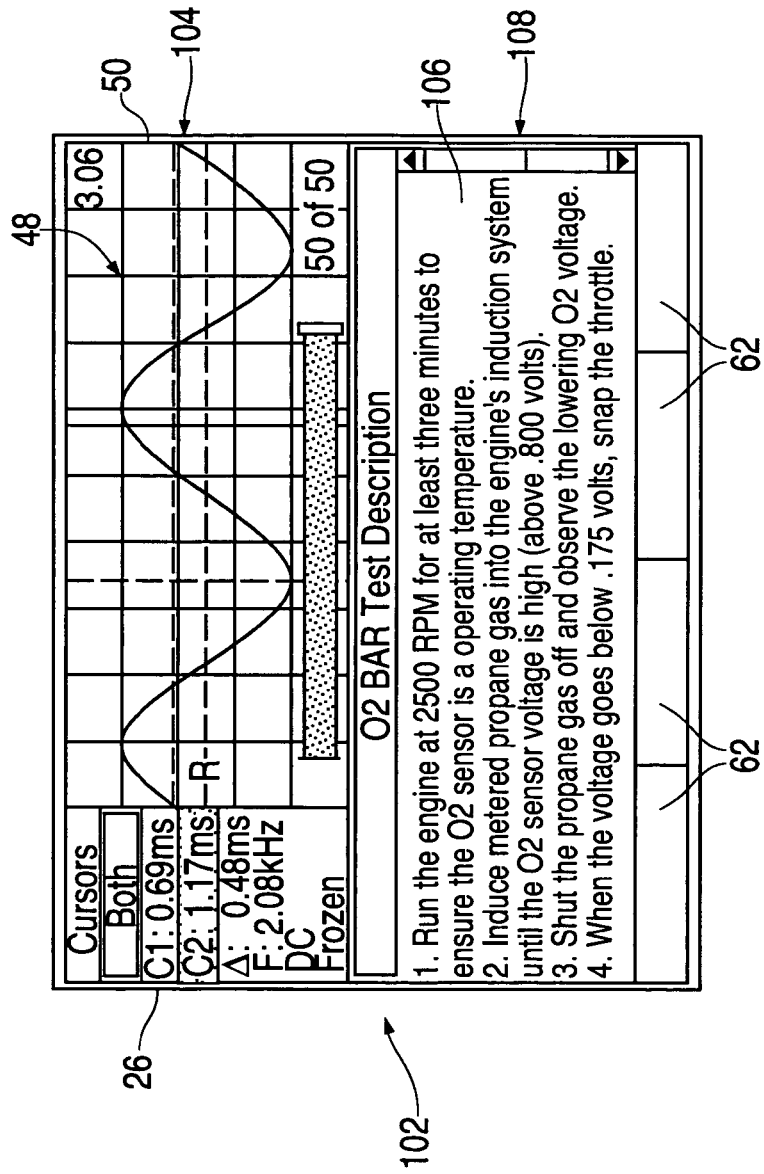
FIG. 6 is a diagrammatic representation of a dual-display layout including a scope display layout and a diagnostic test procedure according to an embodiment of the invention.

The display screen formatter 46 in FIG. 3 can format the graphical coordinate data or other information data for display in a graphical user interface format on the display device 26. For example, the display screen formatter 46 can format both graphical coordinate data and other vehicle technical information data in a dual-display mode 102, as shown in FIG. 6, for simultaneous display on separate portions of the display screen 26. As an example, as shown in FIG. 6, the display screen formatter 46 can format the graphical coordinate data to occupy the upper half 104 of the display screen 26.

In FIG. 6, a scope display layout 48 has been formatted to occupy the upper half 104 of the display screen 26, and a vehicle functional test procedure 106 has been formatted to occupy the lower half 108 of the display screen 26. The display screen formatter 46 can reconfigure the scope display layout 48 to have a reduced vertical dimension so that the scope display format 48 can be fitted into the upper half 104 of the display screen 26. In some embodiments the coordinate grid 52 can maintain the same dimensions, but fewer divisions may be shown. In other embodiments, the display screen formatter 46 can reduce the vertical dimension of the coordinate grid 52 to include the same number of divisions in half the vertical space.

Figure 7:
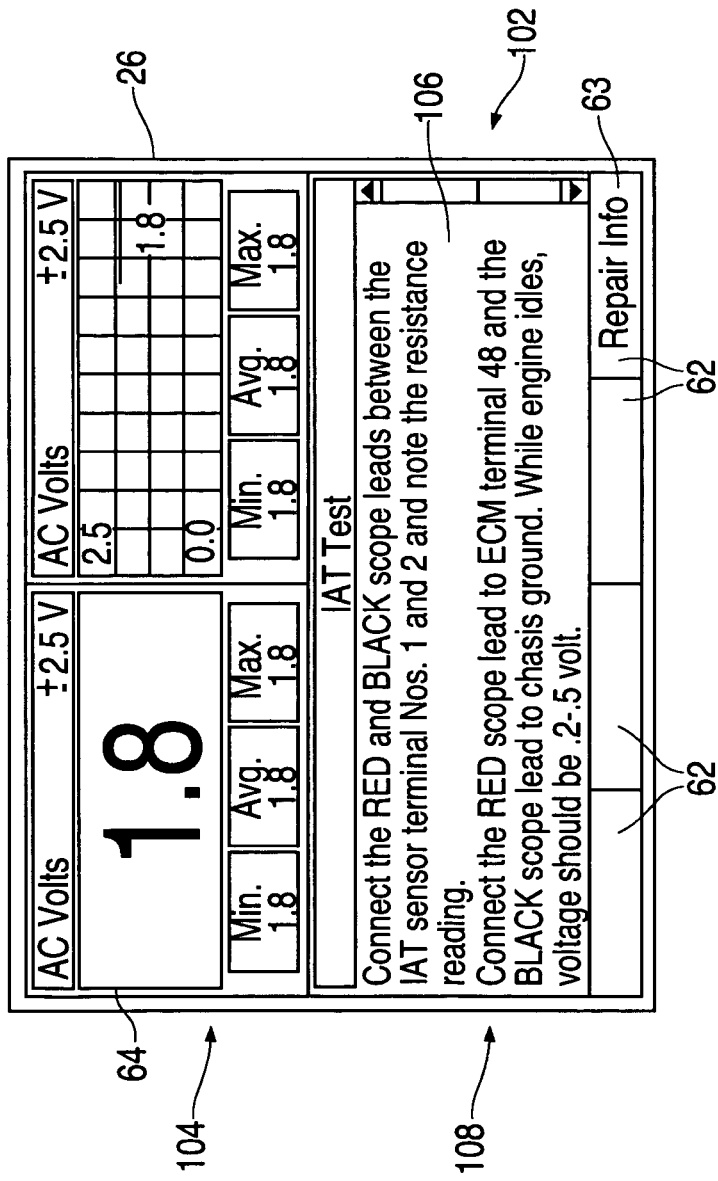
FIG. 7 is a diagrammatic representation of a dual-display screen including a digital multimeter display layout and a diagnostic test procedure according to an embodiment of the invention.

Similarly, as shown in FIG. 7, the display screen formatter 46 can format a digital multimeter display layout 64 to occupy the upper half 104 of the display screen 26, and other vehicle technical information, such as a functional test procedure 106, to occupy the lower half 108 of the display screen 26. Thus, in dual-display mode 102, a vehicle technician can view vehicle diagnostic data in the scope display layout 48 or in the digital multimeter layout 64, and other vehicle information such as a functional test procedure 106 at the same time. Thus, it is not necessary for the vehicle technician to exit the vehicle diagnostic data display mode or consult an external source in order to refer to other vehicle information.

Furthermore, the display screen formatter 46 can format a scope display layout 48 and a digital multimeter display layout 64 for simultaneous display on the upper half 104 and on the lower half 108 of the display screen 26. In this case, the scope display layout 48 and the digital multimeter display layout 64 may display the same vehicle diagnostic data in the two different layout formats, or the scope display layout 48 can display different vehicle diagnostic data than the digital multimeter display layout 64. In effect, the display screen formatter 46 can format any combination of two display screen layouts to be simultaneously displayed.

In some embodiments, a reference wave form that is typical for a particular vehicle system or component can display on one half of the display screen 26 while real-time or stored data is displayed on the other half. Thus, while viewing real-time vehicle diagnostic data or stored data regarding a vehicle system or component, the vehicle technician can also view a reference wave form in dual-display mode 102 in order to compare the actual data with the reference data.

In some embodiments, the display screen formatter 46 can be configured to send the formatted graphical coordinate data representing vehicle diagnostic data to the storage device 40 to be saved. Similarly, the display screen formatter 46 can be configured to retrieve stored formatted graphical data from the storage device 40 for display at a later time.

Moreover, in some embodiments, the display screen formatter 46 can be preprogrammed with a variety of different predetermined display formats, and the display screen formatter 46 can automatically select a display format in which to display the vehicle diagnostic data, based on the type of conditioned vehicle diagnostic data that is received from the signal conditioning module 16. For example, the display screen formatter 46 can select between a scope display layout 48 and a digital multimeter display layout 64, depending on the type of received vehicle diagnostic data. In addition, the display screen formatter 46 can determine the scale or dimension of the divisions of the coordinate grid 52 based on received data parameters, for example, the frequency and the magnitude of the received vehicle diagnostic data.

The logical display buttons 62 can be associated with a menu of options. For example, a logical display button 62 can be associated with a pop-up menu of screen settings that allow the user to customize the display format, for example, the scale or dimension of the divisions of the coordinate grid 52, the display mode, or the like. As another example, a logical display button 62 can be associated with a pop-up menu that lists a selection of different types of vehicle technical information that is available to be displayed. In addition, a logical display button 62 can be associated with an operation, such as "freezing" the display in order to provide a fixed display, resetting the display to a default format, alternating between the dual-display mode 102 and a full screen mode (see FIG. 4), or the like.

Figure 8:
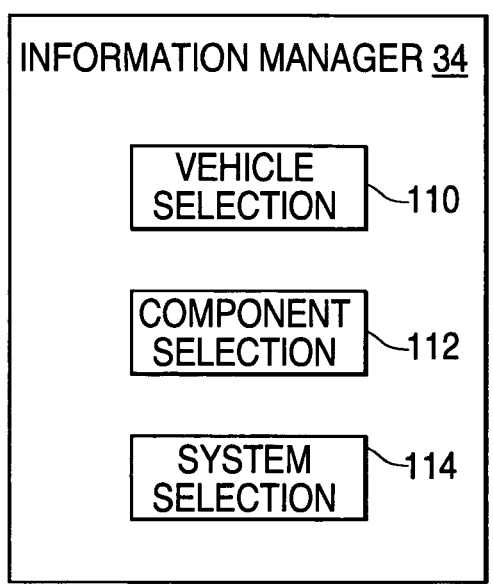
FIG. 8 is a diagrammatic representation of a detail view of the information manager of FIG. 2 according to an embodiment of the invention.

The information manager 34, depicted in FIG. 8, can include a vehicle selection feature 110, a component selection feature 112 and a system selection feature 114. The vehicle selection feature 110 can allow the vehicle technician to select a vehicle type in order to gain access to vehicle technical information specific to that vehicle. For example, as shown in the sequence of representative vehicle selection screen shots 111 in FIG. 9, the technician can select a manufacturer, year, make, category (e.g., "car," "truck" or "van"), model, series, engine and system, or any other identifiable factor that can distinguish a vehicle type, to specify the subject test vehicle type.

Figure 9:
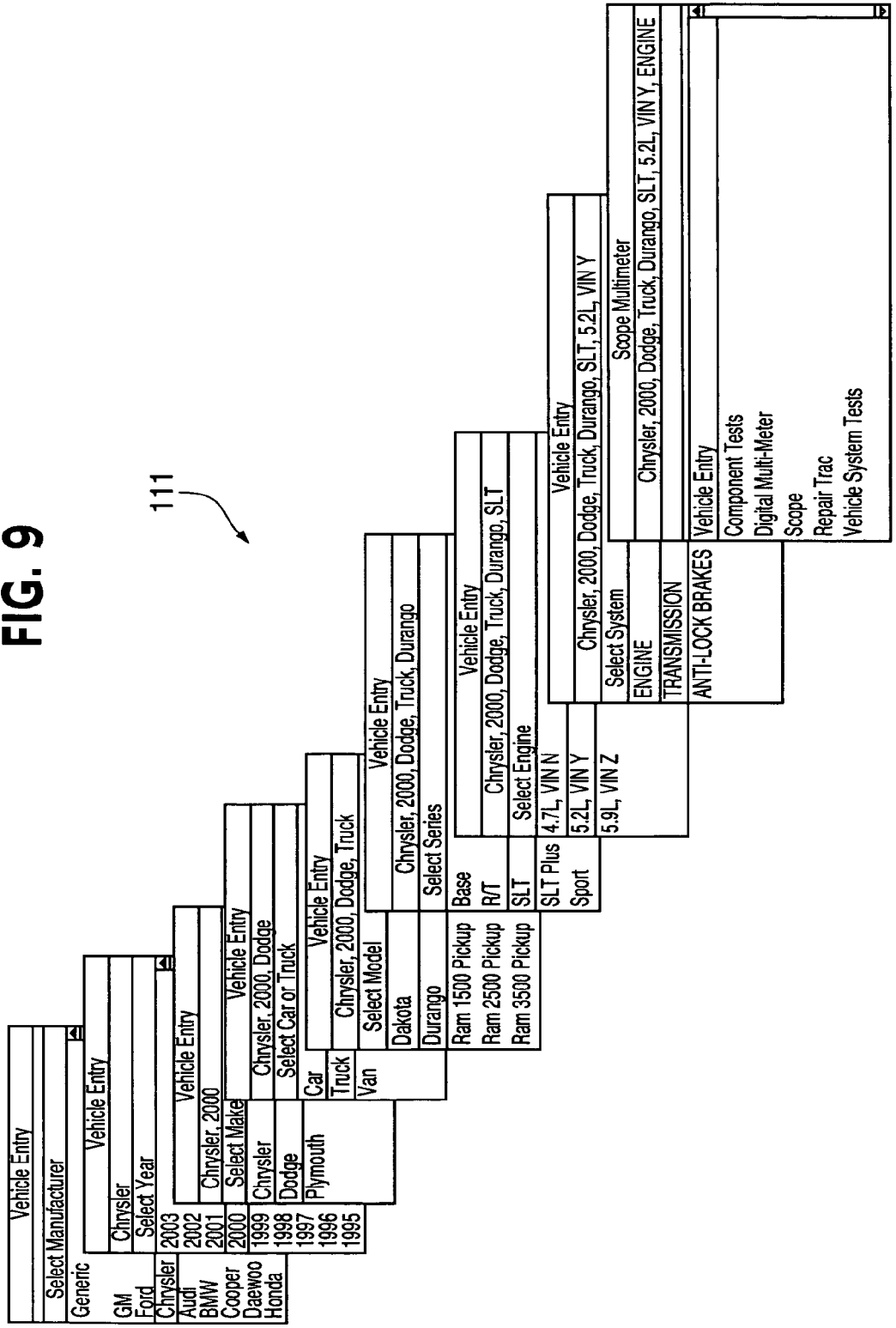
FIG. 9 is a diagrammatic representation of a sequence of display layouts associated with a vehicle selection feature according to an embodiment of the invention.

Once the vehicle type has been selected, or specified, as illustrated in FIG. 9, the information manager 34 can store the vehicle type, for example, in the memory 30, until a new vehicle selection is made or until the vehicle diagnostic tool 10 is powered down. Furthermore, in some embodiments, the vehicle type selection can be stored in non-volatile memory, for example, in a flash memory device, so the vehicle type selection will remain valid after the vehicle diagnostic tool 10 is powered down and newly powered up. Thus, the information manager 34 can retrieve or provide only information applicable to the selected vehicle type, for example, throughout a diagnostic session—which can include a series of component functional tests and system diagnostic tests, as well as other diagnostic tests on the subject test vehicle—or during multiple diagnostic sessions. The technician is not required to reenter the vehicle type for each individual diagnostic test, but rather can continue from one test to another receiving information specific to the subject test vehicle during a series of tests on various vehicle components or systems.

Figure 10:
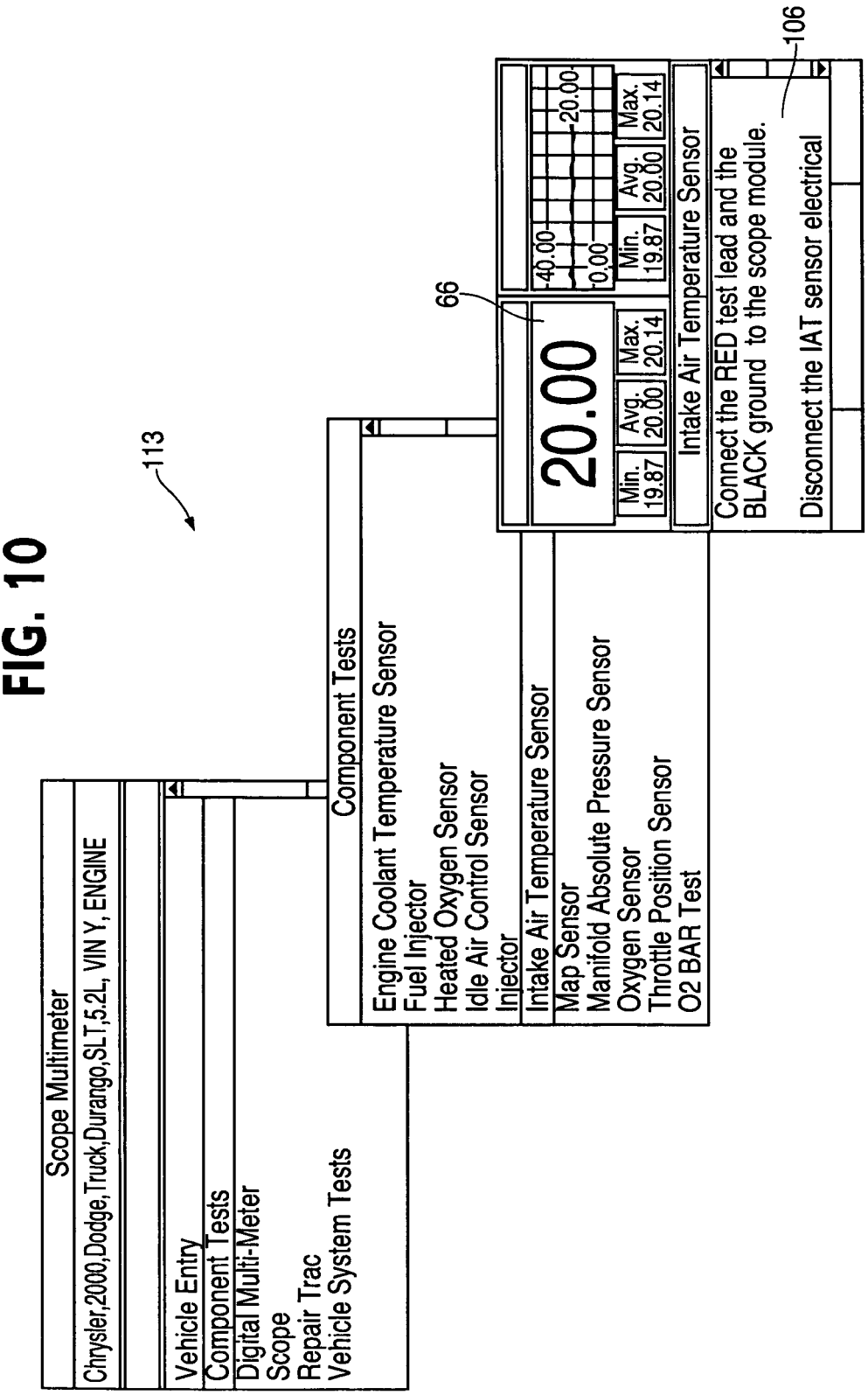
FIG. 10 is a diagrammatic representation of a sequence of display layouts associated with a component selection feature according to an embodiment of the invention.

In addition, as illustrated in the sequence of component selection screen shots 113 in FIG. 10, the component selection feature 112 can allow the vehicle technician to select a particular component of a vehicle to be tested, such as an intake temperature sensor, an oxygen sensor, a cooling water temperature sensor, or the like. The component selection can then be stored throughout a component functional test session, in order to provide access to component-specific vehicle technical information, which may be specific to a particular vehicle or may be vehicle-independent. The information manager 34 can then display an appropriate set of vehicle-specific test instructions. For example, as shown in FIG. 10, the technician can select a specific component test, such as an intake air temperature test, and the information manager 34 can provide an associated information display, such as function test instructions 106, along with an appropriate data display, such as a digital multimeter display layout 64.

Figure 11:
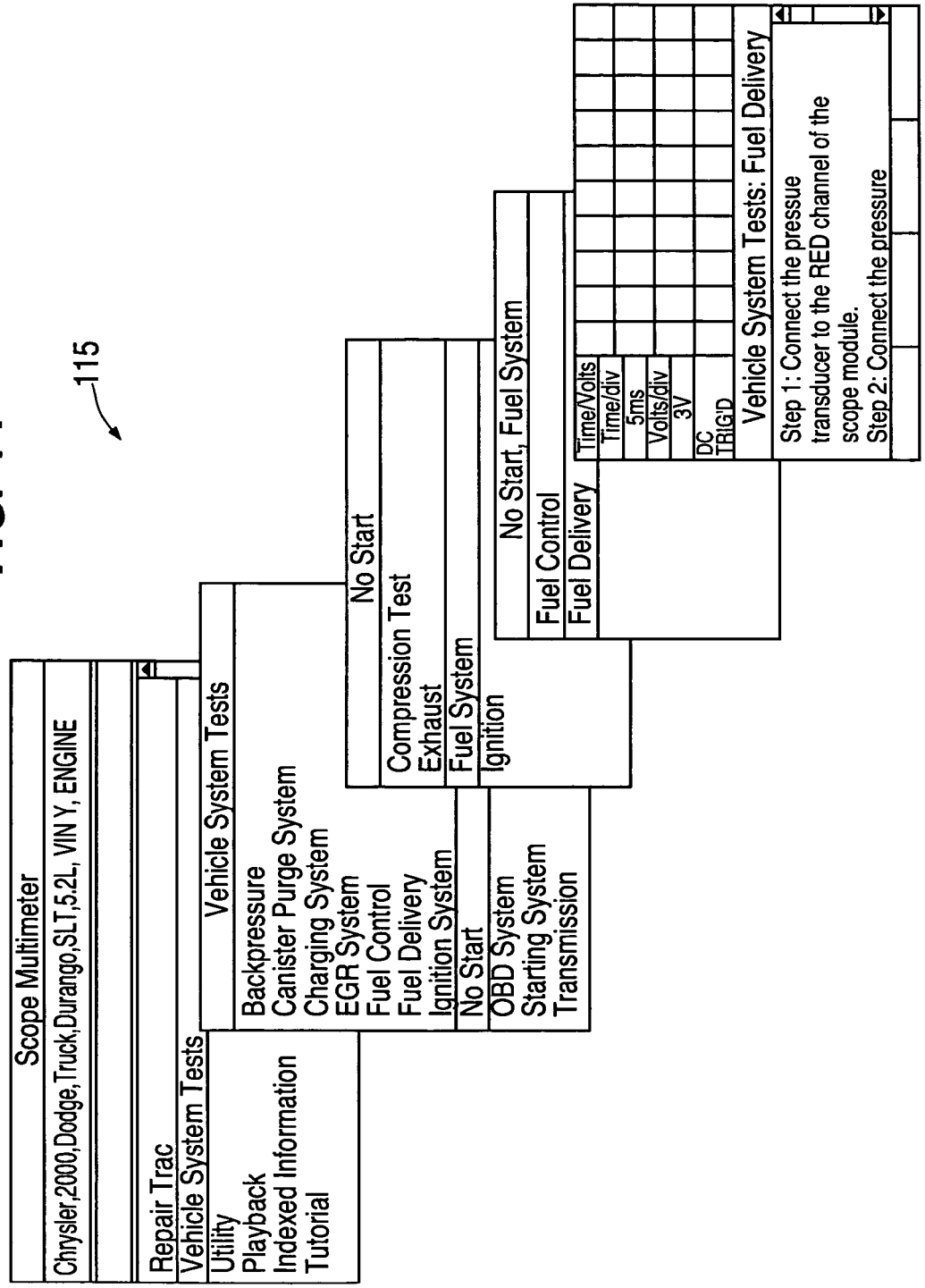
FIG. 11 is a diagrammatic representation of a sequence of display layouts associated with a system selection feature according to an embodiment of the invention.

As illustrated in the sequence of system selection screen shots 115 in FIG. 11, the system selection feature 114 can further allow the vehicle technician to select a particular vehicle system for testing, such as an engine, a transmission, an anti-lock brake system, a power train system, or the like. The system selection can then be stored throughout a system diagnostic test session, in order to provide access to system-specific vehicle technical information, which may be specific to a particular vehicle or may be vehicle-independent. In some embodiments, the vehicle system can be independent of the vehicle type; for example, vehicle system tests can include general instructions for testing systems that can be found on many vehicle types, but which are generally similar enough to permit a generic functional test. The information manager 34 can provide an associated information display, such as function test instructions 106, along with an appropriate data display, such as a scope display layout 48.

The information manager 34 can be configured to access the vehicle technical information database 32, and retrieve a selected segment of the vehicle technical information. The information manager 34 can then send the vehicle technical information to the user interface builder 38 for display. Thus, the information manager 34 can provide the specific vehicle, system or component technical information requested by the vehicle technician.

For example, the user interface builder 38 can receive a functional test procedure 106 (see FIGS. 6 and 7) from the information manager 34 and format the functional test procedure 106 for display on the display device 26. In FIG. 6 the display screen 26 is displaying an oxygen BAR test procedure (promulgated by the California State Bureau of Automotive Repair) in the lower half 108 of the display screen 26. A second example of a representative functional test procedure 106 is shown in FIG. 7, where the display screen 26 includes an input air temperature (IAT) test procedure in the lower half 108 of the display screen 26. In one embodiment, the display screen formatter 46 provides a dual display screen by default, including a scope display layout 48 and a functional test procedure 106 for the current vehicle component that has been selected.

Moreover, the vehicle technician can select vehicle technical information from a menu at a data display screen or a dual-display screen. For example, using a logical display button 62, such as the "Repair Info" button 63 shown in FIG. 7, the vehicle technician can choose to display additional vehicle technical information related to the component test or system test currently being performed. Without exiting from the component or system test, the technician can simply select the "Repair Info" button 63 to view a menu of additional vehicle technical information available to be accessed directly from the current screen. The menu can be a single-level menu—that is, the menu options do not lead to additional menus or other options, but rather directly access a related technical information screen.

Furthermore, the menu options can be minimized, or limited to technical information specifically related to the current component or system test, in order to simplify the menu structure and avoid potential user confusion. For example, the information available to be accessed by way of the "Repair Info" button 63 menu during a vehicle component functional test can be limited to only related information that corresponds to the vehicle type and component currently being tested. Similarly, the information available to be accessed by way of the "Repair Info" button 63 menu during a vehicle type-independent system diagnostic test can be limited to only general, or generic, related information that corresponds to the system currently being tested.

The technician can then select the desired information, such as a circuit description, a circuit diagram, a connector diagram, or technical specifications from the menu to view the information. For example, while viewing a full-screen data display, the technician can select to view a related circuit diagram, which then replaces the data screen. Similarly, while viewing a dual-display screen that includes a data portion and an information portion, the technician can select to replace the information portion with a related circuit diagram while also continuing to view the data portion of the dual-display. Thus, with a single menu selection, the vehicle technician can access a variety of related vehicle technical information in a single step from the data display.

Figure 13:
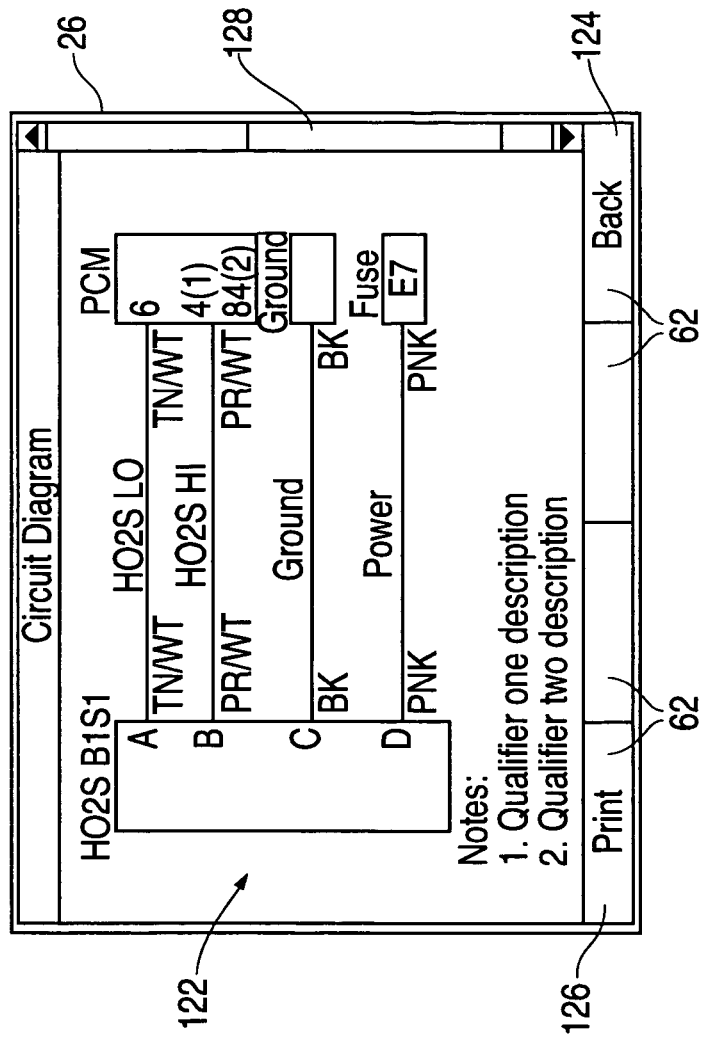
FIG. 13 is a diagrammatic representation of a display layout including a circuit diagram according to an embodiment of the invention.

Furthermore, as shown in FIG. 13, the related technical information display can include one or more logical display buttons 62, including a "BACK" or "EXIT" button 124, for example, so that the vehicle technician can return directly to the previous display screen with one click of a button. In fact, in some embodiments, in order to avoid potential user confusion the vehicle technician is not given other options, or menus, from the related technical information display. Thus, the vehicle technician can switch directly between the data display and the related information display, or between the information portion of the dual-display and the related information display, preventing user confusion that could otherwise result if the technician were given a hierarchy of menu options from the data display.

In some embodiments, another logical display button 62 on the related technical information display, for example, a "PRINT" button 126 to permit the vehicle technician to print the vehicle technical information being displayed with a single click of the "PRINT" button 126. In addition, any of the vehicle technical information screens can include navigation tools such as the scroll bar 128 shown in FIG. 13.

Figure 12:
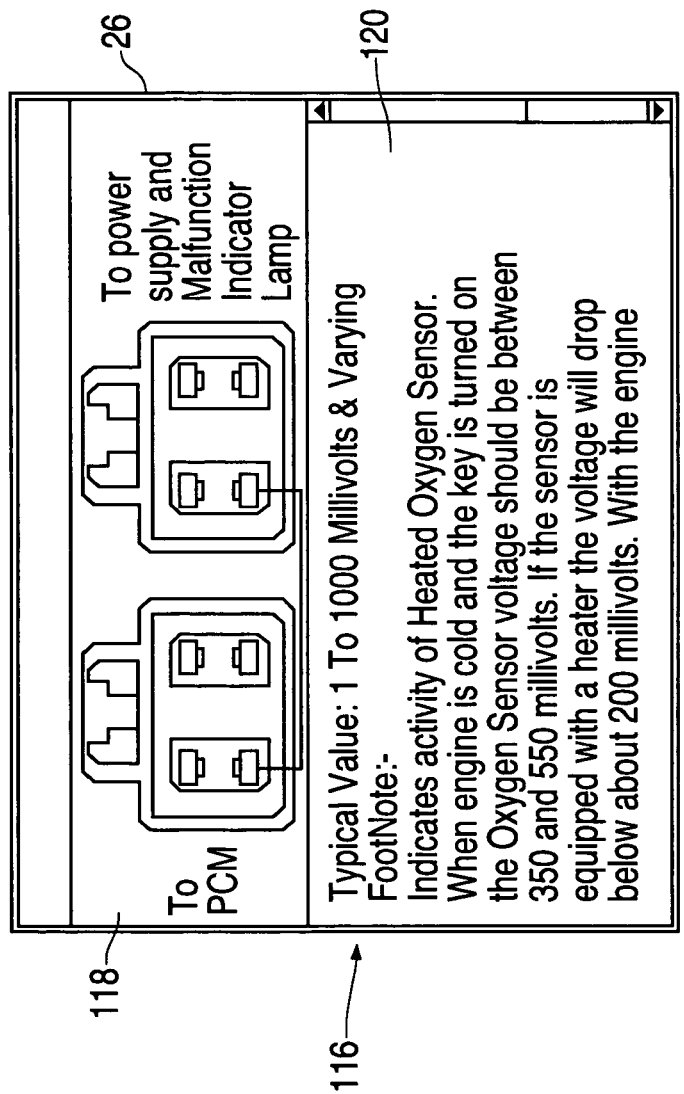
FIG. 12 is a diagrammatic representation of a display layout including a circuit description according to an embodiment of the invention.

In some embodiments, the related technical information can include a circuit description, such as the representative circuit description 116 for a heated oxygen sensor shown in FIG. 12. When the circuit description is requested by a user, the information manager 34 can access a circuit description file in the database and send the circuit description information to the user interface builder 38. The display screen formatter 46 can then format the circuit description 116 for display on the display screen 26. For example, the circuit description 116 can include a basic circuit schematic 118 as well as a text description 120 of the circuit and its functionality. Thus, the vehicle technician can quickly and conveniently access a detailed description of the currently selected component. The database 32 can include circuit description information for any number of different vehicle electrical circuits.

Furthermore, in some embodiments, the information manager 34 can access vehicle wiring information in the database and dynamically create from the wiring information a wiring circuit diagram 122, such as the representative circuit diagram shown in FIG. 13, representing a wiring circuit for a component or system of the vehicle, for example, including wire colors and names. That is, the wiring information stored in the database does not include an image file, but rather includes relationship information regarding the wiring between vehicle components, which the information manager 34 can use to dynamically create at the time a circuit diagram 122 is requested an image file representing the electrical wiring circuit. The created image file is then sent to the user interface builder 38 and the display screen formatter 46 formats the circuit diagram image for display on the display screen 26. Nevertheless, in an alternative embodiment the wiring information stored in the database can include an image file, such as a bitmap file, JPEG file, TIFF file, GIF file, or other standard or proprietary image format file.

Figure 14:
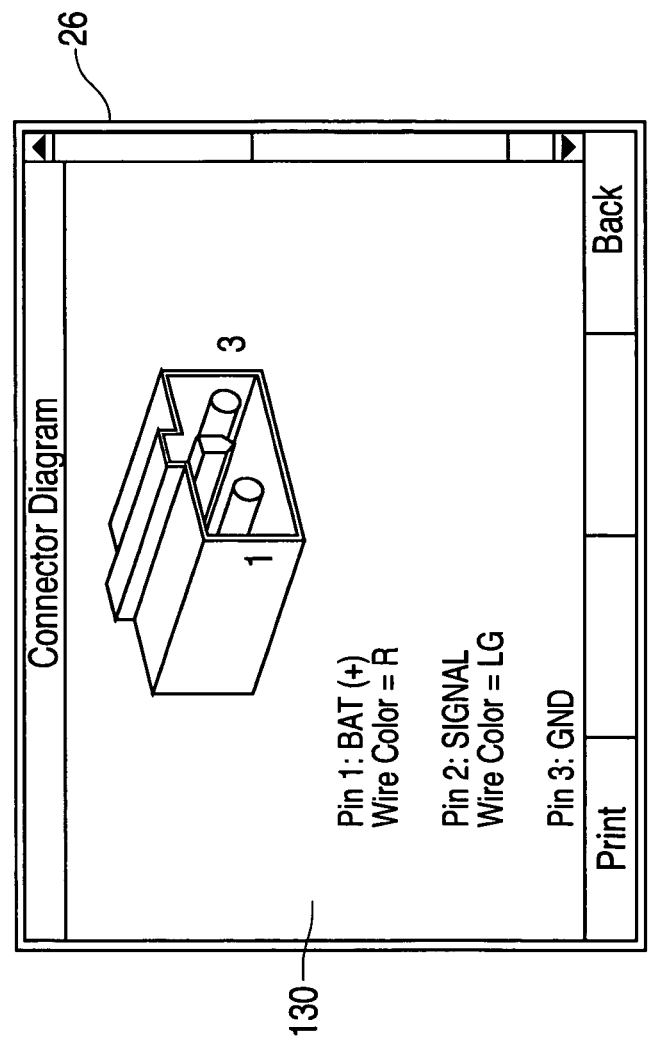
FIG. 14 is a diagrammatic representation of a display layout including a connector diagram according to an embodiment of the invention.
Figure 15:
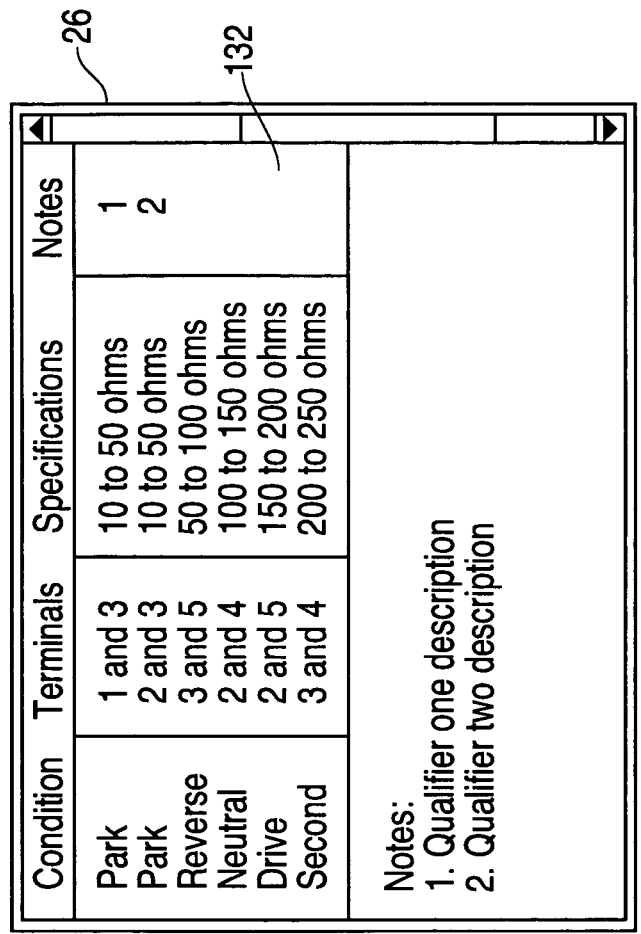
FIG. 15 is a diagrammatic representation of a display layout including a component specification according to an embodiment of the invention.

Additionally, the information manager 34 can access a connector diagram file in the database, for example, showing the connector pin-out and correct connection, and send the connector diagram information to the user interface builder 38. The display screen formatter 46 can then format a connector diagram 130 for display on the display screen 26, such as the representative connector diagram 130 as shown in FIG. 14. Furthermore, the information manager 34 can access component specification information in the database, for example, including proper sensor operating values for specific operating conditions, and send the component specification information to the user interface builder 38. The display screen formatter 46 can then format the component specification 132, such as the representative component specification 132 shown in FIG. 15, for display on the display screen 26.

Figure 16:
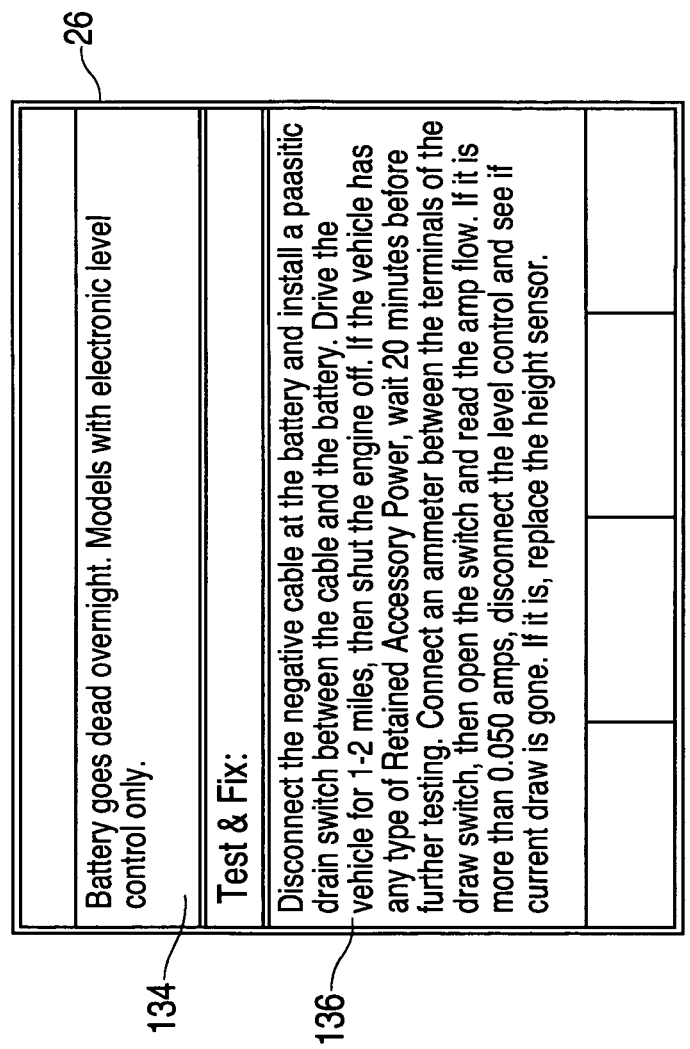
FIG. 16 is a diagrammatic representation of a display layout including a common vehicle condition and an associated repair instruction according to an embodiment of the invention.

Moreover, the information manager 34 can access a collection of known possible vehicle conditions and associated repair guidelines in the database and send the information to the user interface builder 38. The display screen formatter 46 can then format a known possible vehicle condition and associated repair guideline information, such as the representative condition 134 and repair guideline 136 shown in FIG. 16, for display on the display screen 26.

In some embodiments, the technical information management device can further include a data-only mode, or training mode, in which the information manager 34 can retrieve vehicle technical information and simulated vehicle diagnostic data from the database 32 and send the information and data to the user interface builder 38, which can prepare the information and data for display. The training mode display also can include instruction text on the display to help the vehicle technician understand how to use the technical information management device.

In an alternative embodiment, the database 32 can be designed to receive software updates independent from the information manager 34 and the user interface builder 38. Thus, the database 32 can be updated without updating the user information builder 38 or the information manager 34. Likewise, the information manager 34 and user interface builder 38 can be updated without updating the database 32. This architecture gives vehicle technicians added flexibility to efficiently update the desired portions of the technical information management device. Additionally, in one embodiment, the technical information management device can be updated using the proprietary next generation information system (NGIS) software, manufactured by the OTC Division of the SPX Corporation in Owatonna, Minn.

Furthermore, the database 32 can be encrypted. That is, the data recorded in the database 32 can be encoded using a cryptographic algorithm that reconfigures the data in such a manner that it is difficult for the data to be interpreted without an encryption key. In this case, the information manager 34 can be configured to decrypt, or decode, the vehicle technical information after it has been accessed and retrieved from the database. The encryption method can include any of numerous suitable encryption algorithms known in the art.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A technical information management device configured for implementation with a vehicle diagnostic tool, comprising:
    a database containing vehicle technical information;
    an information manager configured to access the database and retrieve a segment of the information;
    a user interface builder configured to prepare an information display including the segment of the information; and
    a component selection feature configured to allow a user to select a vehicle component for which to retrieve information, and further configured to store the component selection throughout a component functional test session, during which the information manager is further configured to retrieve only information corresponding to the component selection.

2. The technical information management device of claim 1, further comprising a system selection feature configured to allow a user to select a vehicle system for which to retrieve information, and further configured to store the system selection throughout a system diagnostic test session, during which the information manager is further configured to retrieve only information corresponding to the system selection.

3. The technical information management device of claim 1, further comprising a vehicle selection feature configured to allow a user to select a vehicle type for which to retrieve information, and further configured to store the vehicle type selection throughout a diagnostic session, during which the information manager is further configured to retrieve only information corresponding to the vehicle type selection.

4. The technical information management device of claim 1, further comprising at least a portion of the information representing text comprising a component functional test procedure.

5. The technical information management device of claim 1, further comprising at least a portion of the information representing text comprising a system diagnostic test procedure.

6. The technical information management device of claim 1, further comprising at least a portion of the information representing vehicle wiring information and the information manager is configured to dynamically create a wiring diagram using the vehicle wiring information and provide the wiring diagram to the user interface builder.

7. The technical information management device of claim 1, further comprising at least a portion of the information representing text comprising one selected from the following: a circuit description, a torque specification, a tune-up fuel specification, a tune-up ignition specification, a component specification, an oil light reset procedure, indexed information, and a repair guideline for a known possible vehicle condition.

8. The technical information management device of claim 1, further comprising at least a portion of the information representing graphics comprising one selected from the following: a vehicle electrical connector diagram, a component location, a transmission pan identification, and a reference waveform that is representative of typical data corresponding to a vehicle system.

9. The technical information management device of claim 1, further comprising a data manager configured to receive conditioned vehicle diagnostic data from the diagnostic tool and format the diagnostic data, and the user interface builder configured to prepare a data display including the diagnostic data and a first logical button whereby a user can access a menu of available vehicle technical information, and to prepare an information display including the segment of the information and a second logical button, and to replace at least a portion of the data display with the information display based on user selection of a choice from the menu, and to return directly to the data display based upon user selection of the second logical button.

10. The technical information management device of claim 1, further comprising a vehicle diagnostic tool configured to operate the information manager, the user interface builder, the database, and the component selection feature and to display the information display.

11. A technical information management device configured for implementation with a vehicle diagnostic tool, comprising:
a database containing vehicle technical information;
a data manager configured to receive conditioned vehicle diagnostic data from the diagnostic tool and format the diagnostic data;
an information manager configured to access the database and retrieve a first segment of the information; and
a user interface builder configured to prepare a data display including the diagnostic data and a first logical button whereby a user can access a menu of available vehicle technical information, and to prepare an information display including the first segment of the information and a second logical button, and to replace at least a portion of the data display with the information display based on user selection of a choice from the menu, and to return directly to the data display based upon user selection of the second logical button.

12. The technical information management device of claim 11, further comprising the menu being a single-level menu.

13. The technical information management device of claim 11, further comprising the data display including a data portion that includes the diagnostic data and an information portion including a second segment of the information.

14. The technical information management device of claim 13, further comprising the user interface builder configured to replace the information portion of the data display with the information display based on user selection of a choice from the menu, and to subsequently replace the information display with the information portion of the data display based upon user selection of the second logical button.

15. The technical information management device of claim 11, further comprising the information display configured not to include an option that allows the user to access an additional display other than the data display.

16. The technical information management device of claim 11, further comprising the information display including a print option.

17. The technical information management device of claim 16, further comprising the information display configured not to include additional options in addition to the second logical button and the print option.

18. The technical information management device of claim 11, further comprising a component selection feature configured to allow a user to select a vehicle component for which to retrieve information, and further configured to store the component selection throughout a component functional test session, during which the menu includes only information that relates to the component selection.

19. The technical information management device of claim 11, further comprising a system selection feature configured to allow a user to select a vehicle system for which to retrieve information, and further configured to store the system selection throughout a system diagnostic test session, during which the menu includes only information that relates to the system selection.

20. The technical information management device of claim 11, further comprising a vehicle selection feature configured to allow a user to select a vehicle type for which to retrieve information, and further configured to store the vehicle type selection throughout a diagnostic session, during which the menu includes only information that relates to the vehicle type selection.

21. The technical information management device of claim 11, further comprising the user interface builder configured to select one from a plurality of predetermined display formats based on a type of the received diagnostic data.

22. The technical information management device of claim 11, further comprising the user interface builder comprising:
a multimeter mode comprising the diagnostic data configured for display in a digital multimeter screen format; and
a scope mode comprising the diagnostic data configured for display in an oscilloscope screen format.

23. The technical information management device of claim 11, further comprising a vehicle diagnostic tool configured to operate the data manager, the information manager, the database, and the user interface builder and to display the data display and the information display.

24. A technical information management device configured for implementation with a vehicle diagnostic tool, comprising:
means for storing a database containing vehicle technical information;
means for facilitating user selection of a vehicle component for which to retrieve information;
means for storing the component selection throughout a component functional test session;
means for accessing the database to retrieve a segment of the information corresponding to the component selection; and
means for preparing an information display including the segment of the information.

* * * * *